United States Patent Office 3,734,978
Patented May 22, 1973

3,734,978
BLOCKING POLYSTYRENE PRODUCED BY
ANIONIC SLURRY POLYMERIZATION
Frederick C. Schwab, Metuchen, N.J., assignor to
Mobil Oil Corporation
No Drawing. Filed May 12, 1971, Ser. No. 142,774
Int. Cl. C08f 19/00
U.S. Cl. 260—878 B
8 Claims

ABSTRACT OF THE DISCLOSURE

There is provided a blocking process for polystyrene in which a styrene monomer is initially polymerized slurried in a paraffinic or monoolefin slurrying medium, using an anionic initiator and a styrene-alkylstyrene block polymer dispersant, a divinyl-benzene modifying agent is added anionically to modify the polystyrene, and the modified polystyrene is blocking with a monomer polymerizable with a free radical initiator, a Ziegler-Natta coordination catalyst, or a cationic initiator.

CROSS-REFERENCE TO RELATED APPLICATIONS

The initial step in the process of this invention, i.e., the slurry polymerization of styrene is the claimed subject matter of an application filed May 12, 1971, Ser. No. 142,821, and entitled "Slurry Process for Producing Styrene Homopolymers and Block Polymers Thereof Using Anionic Catalysts."

BACKGROUND OF THE INVENTION

Field of the invention

This invention is concerned with blocking a polystyrene made by anionic catalyzed slurry polymerization of styrene.

Description of the prior art

Although several patent references have disclosed certain features of the initial slurry process, in the method of this invention none have suggested the combination of factors which lead to the process. For example, in U.S. Pat. No. 3,041,312 there is disclosed an anionic polymerization process that is carried out in a solvent which dissolves the polymer. In such a process, product recovery must be made by separating as by distillation or by precipitating product using large amounts of alcohol. In U.S. Pat. No. 3,095,388 there is disclosed the polymerization of acrylic monomers to produce stable dispersions of the polymers in organic liquid. Such dispersions are produced by using block or graft copolymers in which one constituent is a rubber. In this process the rubber portion of the block polymer is soluble in the organic dispersing medium and the other constituent is insoluble in the organic dispersing medium but compatible with the polymer being formed. This process involves the use of peroxide catalysts and relatively long reaction times. British Pat. No. 893,429 discloses a dispersion polymerization using a lyophilic colloid and a peroxy catalyst. In the case of styrene the dispersing medium is an alcohol. Other patents which disclose a dispersing agent partly soluble in the organic liquid and partly soluble in the polymer, but using long term runs are set forth in British Pats. Nos. 1,007,476 and 1,008,188.

Insofar as is now known, blocking of polymers formed by an anionic slurry process has not been described.

SUMMARY OF THE INVENTION

This invention provides a process that comprises polymerizing a styrene monomer dispersed in a paraffinic or monoolefin hydrocarbon slurrying medium, using an anionic catalyst and a block polymer dispersing medium that is a glassy polymer at room temperature, having no unsaturation and a glass transition temperature greater than 50° C.; adding a divinylbenzene modifying agent, under anionic slurry polymerization conditions, to the polystyrene; terminating anionic slurry polymerization; and blocking with a monomer polymerizable with a free radical initiator, a Ziegler-Natta coordination catalyst, or a cationic initiator.

DESCRIPTION OF THE SPECIFIC EMBODIMENTS

Slurry polymerization

The styrene monomer that is polymerized in the first step of the process of this invention is a non-polar styrene which can have methyl substituents. Styrenes having polar groups such as chloride substituents cannot be used in the anionic catalyzed process. The styrene monomers contemplated include styrene, p-methylstyrene and alpha-methylstyrene. It is contemplated to use two or more monomers to produce copolymers as well as the use of a single monomer.

The anionic catalysts used are basically of two types. One type is a mono-initiator such as butyl lithium; sec-butyl lithium, t-butyl lithium, amyl lithium, and ethyl lithium. Another type of initiator is the so-called di-initiator such as the lithium or sodium salts of alpha methyl styrene or of 1,1-diphenylethylene. The range of concentration of the initiator based upon the amount of styrene reactant is $10^{-1}$ to $10^{-4}$ moles of initiator/100 g. of styrene.

The slurrying medium used is a non-solvent for the styrene polymer. In general, the slurrying medium is a paraffinic or monoolefinic hydrocarbon having between about 4 and about 7 carbon atoms, which can be normal or branched. Aromatic hydrocarbons are not utilizable nor are other polar solvents. Typical slurrying media include butane, pentane, isopentane, hexane, heptane, 2,2-dimethylbutane, butene, pentene, as well as mixtures such as petroleum ether, pentane-pentene, and hexane-hexene. The polymerization process of the invention is carried out at temperatures between about 30° C. and about 100° C. The desired polymerization temperature is determined in part by the reflux temperature of the slurrying medium. It is, however, within the contemplation of this invention to use pressure in order to elevate the reflux temperature of the slurrying medium.

An additional advantage is obtained in the present process when the slurrying medium is relatively volatile such as butane, pentane, isopentane, hexane, or petroleum ether. In this case, slurrying medium is absorbed into the polymer product thus producing a foamable product.

The suspending agent used to maintain the polymer in suspension as it is formed is a non-rubbery AB or ABA block polymer. In the block polymer suspending agent segment A is derived from styrene in amounts of 10 to 80 weight percent styrene based upon the total block polymer. Segment B is an alkyl styrene, such as t-butylstyrene, whose polymer has a glass transition greater than 50° C. The amount of suspending agent used is between about 0.1 and about 1.0 weight percent of the styrene reactant. The optimum amounts depends upon the particular block polymer structure used.

A block polymer dispersant that has been found to be particularly effective is a block polymer of styrene and t-butylstyrene. It is effective when the block polymer contains 10 to 80 weight percent styrene. This block polymer is particularly advantageous over the rubbery dispersants of the prior art in that very low concentration levels are effective. In addition, the new dispersants should not lower the softening temperature of the polystyrene or contribute to oxidative degradation, as might be the case of the diene block polymers. The following example illustrates a block polymer of this type.

EXAMPLE 1

In a reaction vessel equipped with a reflux condenser and agitation means were added 21 ml. of t-butylstyrene and 375 ml. of benzene. The solution was degassed by the application of a vacuum, followed by replacement with nitrogen. This step was repeated several times to insure proper degassing. A slight stream of nitrogen was continued throughout the ensuing polymerization reaction. A quantity of 1.9 ml. of 0.5 M sec-butyl lithium was added to initiate the reaction and the temperature was raised to 75° C. The polymerization was continued for 45 minutes. At this time 64 ml. of purified styrene monomer was added to the reactor and polymerization was allowed to proceed for an additional 30 minutes. The block polymer was separated from solution by precipitation in methanol. The reaction produced 74 grams of a block polymer containing 75 percent styrene by weight. Molecular weight for this block polymer was found to be $\overline{M}s \times 10^{-3}$ (g./mole)=80.

The following example demonstrates the anionic slurry polymerization step in this invention.

EXAMPLE 2

A quantity of 0.1 gram of the block polymer of Example 1 was dissolved in 10 gm. of styrene monomer under nitrogen atmosphere and 50 ml. of hexane was added. The block polymer precipitated into a stable emulsion. The hexane was then brought to its reflux temperature (68° C.) and 0.25 mmole sec-butyl lithium was added. The solution went to a red color immediately and a slight rise in the reflux temperature was noted due to the polymerization exotherm. The heat of polymerization was dissipated through the refluxing solvent. In about 12–15 seconds from the time of initiation, the "living" polystyrene precipitated from the hexane into a finely divided stable slurry. The polymerization was continued until complete (about 10 minutes).

POLYMER MODIFICATION

In accordance with this invention, if a monomer that is not polymerizable by anionic catalysis is to be added ("blocked") to the aforedescribed slurried polystyrene, the polystyrene must be modified before blocking on such monomer. Such modification is effected by adding on a divinylbenzene modifying agent. The divinylbenzene modifying agent is p-divinylbenzene (preferred), m-divinylbenzene, or mixtures of p- and m-divinylbenzene and methylsubstituted derivatives of p- or m-divinylbenzene. The amount of divinylbenzene modifying agent used is small, i.e., 0.5–1 g./100 g. polystyrene.

Generally, the modification is carried out using the aforedescribed slurry of polystyrene with the anionic catalyst still present. In general, the modification is carried out under the same conditions of time and temperature used in the anionic slurry polymerization of styrene reactant.

EXAMPLE 3

After the anionic slurry polymerization described in Example 2 was complete, 0.054 g. of p-divinylbenzene was added and the slurry reaction was contined at reflux for an additional 5 minutes. The reaction was then terminated by adding a small amount of methanol, thus giving a modified polystyrene having about 2 molecules p-divinylbenzene per polymer chain.

BLOCKING TO THE MODIFIED POLYSTYRENE

The blocking of the modified polystyrene is carried out using a free radical initiator, a Ziegler-Natta coordination catalyst system, or a cationic initiator. The blocking reaction can be carried out using the same slurry used to prepare the modified polystyrene. Alternatively, the polymer can be separated from the slurry and reslurried in another of the aforedefined paraffinic or olefinic hydrocarbons.

Although any free radical initiator can be used, it is preferred to use a peroxy compound that is activated at relatively low temperatures. Typical peroxy initiators include benzoyl peroxide, t-butylperoxypivalate, t-butylperoxide, and dicumyl peroxide. The amount of free radical initiator used will be between about 0.1 g. and about 2 g. per 100 g. polystyrene.

The Ziegler-Natta coordination catalyst used for blocking in accordance with this invention is composed of at least two components, one being a compound of a transition metal of Groups IV–A, V–A, VI–A and VIII of the Periodic Arrangement of the Elements in a reduced valence state and the other being an organometallic compound of a metal of Groups II and III of the Periodic Arrangement of the Elements. The Periodic Arrangement of the Elements, as referred to herein, is that published in the Journal of Chemical Education, volume 16, page 409 (1939).

Among the reducible transition metal compounds suitable for the purposes of this invention are the heavy metal, inorganic compounds such as halide, oxyhalides, complex halides, hydroxides, and organic compounds such as alcoholates, acetates, benzoates, and acetyl acetonates, of the metals of Groups IV–A, V–A, VI–A, and VIII of the Periodic Arrangement of the Elements. Such metals include titanium, zirconium, hafnium, thorium, uranium, vanadium, niobium, tantalum, chromium, molybdenum, tungsten and iron.

The other component of the catalyst system is at least one organometallic compound of a metal of Groups II and III. These compounds will have at least one hydrocarbon radical, i.e., alkyl, cycloalkyl, aralkyl, alkaryl, or aryl, attached to the metal through a carbon atom. The other substituents in the organometallic compound can be hydrocarbon radicals, halogen radicals, alkoxy, amino, hydrogen, etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromo aluminum hydride, dipropylaluminum hydride, propyl zinc hydride, ethylmagnesium hydride, and methoxyaluminum diethyl. Mixtures of two or more organometallic compounds can be used.

In activating the reduced transition metal compound (e.g., $TiCl_3$) with an organometallic compound (e.g., diethylaluminum chloride) various ratios can be used. Thus, the molar ratio of these two components (e.g, Al/Ti) can range from 3 to 100 moles of organometallic compound per mole of reduced transitional metal compound. More detailed description of these catalysts can be found in various patents such as U.S. Pat. No. 3,362,940.

The cationic initiator can be a Ziegler-Natta catalyst as aforedescribed or it can be only the organometallic component or a Friedel-Crafts catalyst such as aluminum chloride, aluminum bromide or borontrifluoride. The main difference between the Ziegler-Natta and the cationic catalyst is in their manner of catalytic operation. Thus, for example, isobutylene polymerizes cationically.

As will be appreciated by those skilled in the art, a wide variety of monomers may be blocked in accordance with this invention, depending upon the type of properties it is desired build into the polymer molecule. The monomers can be polar molecules such as for example acrylic acid, methacrylic acid, vinylidene chloride, vinylfluorides and the like. The monomer can also be an olefin having 2 to 10 carbon atoms such as ethylene, propylene, butene-1, isobutylene, amylene, hexene, octene, or decene.

The following examples illustrate the blocking step of the process of this invention.

EXAMPLE 4

To a polystyrene slurry prepared as described in Example 3 was added 2 g. of acrylic acid and 0.4 g. of benzoyl peroxide. The slurry was heated to 70° C. for 60 minutes and the reaction terminated by pouring the slurry mixture into a large amount of methanol. The blocked product was separated and analysis showed about 17 weight percent blocked acrylic acid.

EXAMPLE 5

To a polystyrene slurry prepared as described in Example 3 was added at room temperature 15 ml. of vinylidene chloride and 0.5 ml. of t-butylperoxypivalate. The temperature was then raised to 60° C. and the polymerization was allowed to proceed for 3 hours. The resulting blocked polymer was collected and analyzed to show 6.3 weight percent vinylidene chloride.

EXAMPLE 6

A quantity of 5 g. of polystyrene prepared as described in Example 3 and separated from the hexane slurry was slurried into 20 ml. of butene-1. To the slurry was added 0.3 ml. of diethylaluminum chloride and 0.20 ml. of trimethylsilylvanadate. The aluminum to vanadium molar ratio was 50. Ethylene was added to the amount of 10 p.s.i. Then the pressure was adjusted to 30 p.s.i. with hydrogen and the reactor was finally pressured to 130 p.s.i. with ethylene. The polymerization was allowed to proceed for 30 minutes at 0° C. The product was separated and extracted with hexane in a Soxhlet Extractor and there were obtained 5.7 g. of hexane-insoluble block copolymer and 1.9 g. of heptane-soluble ethylene butene copolymer.

EXAMPLE 7

A quantity of 5 g. of polystyrene produced as described in Example 3 and separated from the hexane slurry was slurried into isobutylene at −80° C. To this was added 0.5 ml. of 25 percent diethylaluminum chloride and 5 mg. of trimethylsilylvanadate. The aluminum to vanadium molar ratio was 35. The polymerization was allowed to proceed for one hour at −80° C. Total yield of polymer was 6.8 g.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process that comprises polymerizing a monomer selected from the group consisting of styrene, paramethylstyrene, alpha-methylstyrene and mixtures thereof, dispersed in a non-polar paraffinic or monoolefin hydrocarbon slurrying medium, using an anionic mono-initiator or di-initiator catalyst and between about 0.1 and about 1.0 weight percent of the block polymer dispersing medium that is a glassy polymer at room temperature, having no unsaturation and a glass transition temperature greater than 50° C.; then adding a divinylbenzene modifying agent, under anionic slurry polymerization conditions, to the polystyrene; terminating anionic slurry polymerization with a small amount of methanol; blocking with a second monomer not polymerizable with said anionic catalyst but polymerizable with a blocking catalyst that is a free radical initiator, a Ziegler-Natta coordination catalyst, or an organometallic component of a Ziegler-Natta coordination catalyst or a Friedel-Crafts catalyst.

2. The process of claim 1, wherein said monomer is styrene and said slurrying medium is hexane.

3. The process of claim 2, wherein said block polymer dispersing medium is a t-butylstyrene-styrene block polymer.

4. The process of claim 3, wherein said divinylbenzene modifying agent is p-divinylbenzene.

5. The process of claim 4, wherein said second monomer is acrylic acid and said blocking catalyst is a peroxy initiator.

6. The process of claim 4, wherein said second monomer is vinylidene chloride and said blocking catalyst is a peroxy initiator.

7. The process of claim 4, wherein said second monomer is ethylene and said blocking catalyst is a diethylaluminum-chloride - trimethylsilylvanadate coordination system.

8. The process of claim 4, wherein said second monomer is isobutylene and said blocking catalyst is a diethylaluminum-chloride - trimethylsilylvanadate coordination system.

References Cited

UNITED STATES PATENTS

| | | | |
|---|---|---|---|
| 3,459,832 | 8/1969 | Kern | 260—886 |
| 3,493,636 | 2/1970 | Grunin et al. | 260—886 |

OTHER REFERENCES

Shields et al., Def. Pub. Search Copy of S. N. 657,707 filed Aug. 1, 1967, published in 866OG701 on Sept. 16, 1969. Def. Pub. #T866,013 (260—878 B).

JOSEPH L. SCHOFER, Primary Examiner

A. HOLLER, Assistant Examiner

U.S. Cl. X.R.

260—884, 886